US009176650B2

(12) United States Patent
Park et al.

(10) Patent No.: US 9,176,650 B2
(45) Date of Patent: Nov. 3, 2015

(54) METHOD AND APPARATUS FOR DISPLAYING GRAPHICAL USER INTERFACE DEPENDING ON A USER'S CONTACT PATTERN

(71) Applicant: Samsung Electronics Co., Ltd., Suwon-si (KR)

(72) Inventors: Yong Gook Park, Yongin-si (KR); Min Kyu Park, Seongnam-si (KR); Hee Jeong Choo, Anyang-si (KR); Hyun Ki Kim, Seoul (KR); Hyun Jin Kim, Gwangju (KR); Ji Yeon Kwak, Seoul (KR); Eun Young Lim, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 14/297,263

(22) Filed: Jun. 5, 2014

(65) Prior Publication Data

US 2014/0289655 A1 Sep. 25, 2014

Related U.S. Application Data

(63) Continuation of application No. 13/928,010, filed on Jun. 26, 2013, now Pat. No. 8,749,510, which is a continuation of application No. 12/548,704, filed on Aug. 27, 2009, now Pat. No. 8,493,342.

(30) Foreign Application Priority Data

Oct. 6, 2008 (KR) .................. 10-2008-0097591
Feb. 17, 2009 (KR) .................. 10-2009-0012687

(51) Int. Cl.
*G06F 3/0484* (2013.01)
*G06F 1/16* (2006.01)
(Continued)

(52) U.S. Cl.
CPC .............. *G06F 3/0484* (2013.01); *G06F 1/169* (2013.01); *G06F 1/1626* (2013.01); *G06F 3/016* (2013.01); *G06F 3/03547* (2013.01); *G06F 3/0414* (2013.01); *G06F 3/0488* (2013.01)

(58) Field of Classification Search
CPC combination set(s) only.
See application file for complete search history.

(56) References Cited

U.S. PATENT DOCUMENTS 7,002,557 B2 * 2/2006 Iizuka et al. .................. 345/173
2003/0095095 A1 5/2003 Pihlaja
(Continued)

FOREIGN PATENT DOCUMENTS

CN 1397870 2/2003
CN 1610875 4/2005
(Continued)

OTHER PUBLICATIONS

European Search Report dated Jan. 2, 2012 in European Application No. 09167533.0.

(Continued)

*Primary Examiner* — Van Chow
(74) *Attorney, Agent, or Firm* — H.C. Park & Associates, PLC

(57) ABSTRACT

A graphical user interface (GUI) may be displayed on a display unit in an apparatus which may include a tactile sensor unit. When a contact by a user is detected at the tactile sensor unit, a control unit may receive a contact detection signal therefrom. Based on the contact detection signal, the control unit may determine a contact pattern and may then display the GUI corresponding to the contact pattern. The GUI may be displayed and modified depending on the location and pressure of contacts by a user's manipulating fingers. Therefore, a user can manipulate the apparatus without any inconvenience or accidental touches.

20 Claims, 16 Drawing Sheets

(51) Int. Cl.
  *G06F 3/0354* (2013.01)
  *G06F 3/041* (2006.01)
  *G06F 3/0488* (2013.01)
  *G06F 3/01* (2006.01)

(56) References Cited

U.S. PATENT DOCUMENTS

| 2003/0142081 | A1* | 7/2003 | Iizuka et al. | 345/173 |
|---|---|---|---|---|
| 2005/0012723 | A1 | 1/2005 | Pallakoff | |
| 2006/0022955 | A1* | 2/2006 | Kennedy | 345/173 |
| 2006/0026535 | A1* | 2/2006 | Hotelling et al. | 715/863 |
| 2006/0111093 | A1 | 5/2006 | Shim et al. | |
| 2006/0197750 | A1 | 9/2006 | Kerr et al. | |
| 2008/0119237 | A1 | 5/2008 | Kim | |
| 2009/0143141 | A1* | 6/2009 | Wells et al. | 463/37 |

FOREIGN PATENT DOCUMENTS

| CN | 1752909 | 3/2006 |
|---|---|---|
| CN | 101133385 | 2/2008 |
| CN | 101183292 | 5/2008 |
| JP | 2008/027183 | 2/2008 |
| KR | 1020070040821 | 4/2007 |
| KR | 1020070111266 | 11/2007 |
| KR | 10-2007-0116065 | 12/2007 |
| KR | 1020080028852 | 4/2008 |
| WO | 2006/096501 | 9/2006 |

OTHER PUBLICATIONS

JP2008027183 English Translation Feb. 7, 2008 Tsuruta Akira.
Chinese First Office Action dated Jul. 13, 2012 in Chinese Patent Application No. 200910169036.1.
Non-Final Office Action dated Jun. 20, 2012 in U.S. Appl. No. 12/548,704.
Final Office Action dated Jan. 9, 2013 in U.S. Appl. No. 12/548,704.
Notice of Allowance dated Mar. 21, 2013 in U.S. Appl. No. 12/548,704.
Non-Final Office Action dated Oct. 7, 2013 in U.S. Appl. No. 13/928,010.
Notice of Allowance dated Jan. 29, 2014 in U.S. Appl. No. 13/928,010.
Chinese Office Action dated Nov. 25, 2013 in Chinese Patent Application No. 200910169036.1.
Chinese Office Action issued on Jun. 5, 2014, in Chinese Patent Application No. 200910169036.1.
Korean Office Action dated Aug. 21, 2015, in Korean Patent Application No. 10-2009-0012687.

* cited by examiner

METHOD AND APPARATUS FOR DISPLAYING GRAPHICAL USER INTERFACE DEPENDING ON A USER'S CONTACT PATTERN

CROSS REFERENCE TO RELATED APPLICATIONS

This application is a continuation of U.S. patent application Ser. No. 13/928,010, filed on Jun. 26, 2013, which is a continuation of U.S. patent application Ser. No. 12/548,704, filed on Aug. 27, 2009, now U.S. Pat. No. 8,493,342, issued on Jul. 23, 2013, and claims priority from and the benefit of Korean Patent Application No. 10-2008-0097591, filed on Oct. 6, 2008, and Korean Patent Application No. 10-2009-0012687, filed on Feb. 17, 2009, which are hereby incorporated by reference for all purposes as if fully set forth herein.

BACKGROUND OF THE INVENTION

1. Field of the Invention

Exemplary embodiments of the present invention relate to a graphical user interface (GUI) for electronic devices and, in particular, to a method and apparatus for displaying a GUI according to a user's contact pattern.

2. Description of the Background

A touch screen may be used as a display unit and an input unit. Therefore, electronic devices having a touch screen may not require additional display and input units. Because of this advantage, a touch screen may be widely used for limited-size electronic devices such as, for example, mobile devices, which may also be referred to as portable devices or handheld devices.

Typically, a user can manipulate a touch screen with one hand or both hands to command an execution of a desired function or application. When a user uses both hands, one hand may grip a device, and the other hand may touch a touch screen of the device. However, when a user uses only one hand, parts of the touch screen may often be hidden by a finger (e.g., the thumb) of a gripping hand.

FIG. 10A is an illustrative example showing a user's left thumb selecting one of the menu icons displayed on a touch screen. In this example, if a user touches a specific icon (e.g., Music Icon) located in the upper right portion on the touch screen, some of the other icons (e.g., Game Icon, Display Icon, and Scheduler Icon) displayed on the touch screen may be entirely or partially hidden by the thumb. Additionally, these hidden icons may be in contact with the thumb, and thereby functions associated with the hidden icons may be undesirably executed.

FIG. 10B is another illustrative example showing a user's left thumb touching a scroll bar presented on the touch screen. If the user touches the scroll bar located at the right side on the touch screen, displayed content (e.g., scene) may be hidden by the thumb. Furthermore, some displayed content may undesirably be touched with the thumb and accessed.

An electronic device having tactile sensors may provide control of electronic device applications only if a user keeps contact with a specific part of the device without using a touch screen or a keypad. Such electronic devices may provide a display screen with a GUI to guide contact-based inputs. If the GUI is displayed in a fixed form regardless of a user's contact pattern, some positions in the GUI may fail to note/input the user's contact. This may be due to differences in individual hand sizes, finger sizes, and grip forms. It is difficult to realize a GUI adapted for multiple users. If no match exists between a position in the GUI and a contact point of the user's contact, confusion may be generated when a user manipulates applications on the electronic device.

SUMMARY OF THE INVENTION

Exemplary embodiments of the present invention provide a method and apparatus for displaying a graphical user interface (GUI) adapted to a user's manipulating hand.

Exemplary embodiments of the present invention also provide an apparatus having a touch screen and a tactile sensor.

Additional features of the invention will be set forth in the description which follows, and in part will be apparent from the description, or may be learned by practice of the invention.

Exemplary embodiments of the present invention disclose a method for displaying a GUI on a display unit in an apparatus including tactile sensor unit. The method comprises detecting at the tactile sensor unit a contact by a user, determining a contact pattern from the detected contact, and displaying the GUI corresponding to the contact pattern.

Exemplary embodiments of the present invention provide an apparatus for displaying a GUI. The apparatus comprises a tactile sensor unit configured to create a contact detection signal when detecting a user's contact, including a left sensor part and a right sensor part, each sensor part having a plurality of sensor components, a display unit configured to display the GUI, and a control unit configured to receive the contact detection signal from the tactile sensor unit, to determine a contact pattern based on the contact detection signal, and to control the display unit to display the GUI corresponding to the contact pattern.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1A:
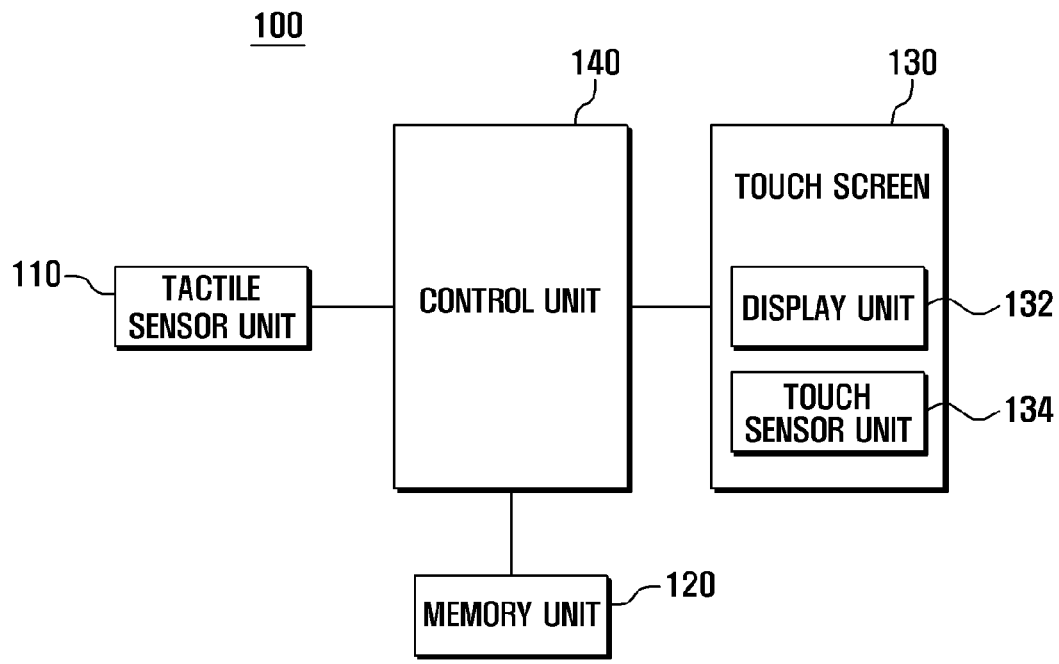
FIG. 1A is a block diagram illustrating an internal configuration of an apparatus according to exemplary embodiments of the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

The terminology used herein is for the purpose of describing particular exemplary embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Furthermore, well known or widely used techniques, elements, structures, and processes may not be described or illustrated in detail to avoid obscuring the essence of the exemplary embodiments.

Prior to explaining exemplary embodiments of the present invention, relevant terminology will be defined for the description below.

A graphical user interface (GUI) may refer to a graphic display provided on a display (e.g., screen) of an electronic device. The GUI may include at least one window, at least one icon, at least one scroll bar, and any other graphical items used for inputting commands to the device by a user. It should be understood that exemplary embodiments of the present invention may include various types of GUIs in various shapes, designs, and configurations.

A manipulating hand may refer to an electronic device user's hand engaged with manipulation of the electronic device's touch screen. The manipulating hand may include one or more hands by which a touch action is made on the touch screen. Additionally, the manipulating hand may include one or more hands in contact with the electronic device having a tactile sensor. The manipulating hand may be a user's left hand, right hand, or both hands.

A tactile sensor unit or a tactile sensor may refer to at least one sensor sensitive to a user's touch. The tactile sensor unit may be different from touch sensors included in the touch screen and the tactile sensor unit may be located generally on at least one lateral side of the device. If a user grips the device, the tactile sensor unit may detect the contact between a user's hand and the device, create a contact detection signal, and transmit the contact detection signal to a control unit. The tactile sensor unit may be composed of at least one tactile sensor that can detect the extent of a contact pressure and the location of contact/pressure. Alternatively, the combination of pressure sensors and touch sensors may be used for the tactile sensor unit. The tactile sensor unit may include a left sensor part and a right sensor part, each of which may be composed of a plurality of sensor components. The tactile sensor unit may be formed on the upper side and/or the lower side, or may be formed on any and/or all sides of the device.

Sensor components may refer to elements constituting the tactile sensor unit. Each sensor component may separately detect a user's contact. The number of sensor components included in the tactile sensor unit may be determined based on the type or size of sensor components.

A component group may refer to a set of sensor components arranged in sequence among contact-detecting sensor components. The component group may be used for creating contact pattern information. The location of the component group and the number of sensor components included in a single component group may vary according to the user's grip form.

Hereinafter, exemplary embodiments of the present invention are described in detail with reference to the accompanying drawings.

FIG. 1A is a block diagram illustrating an internal configuration of an apparatus according to exemplary embodiments of the present invention.

Referring to FIG. 1A, the apparatus 100 may be a mobile communication terminal, a portable terminal such as a personal digital assistant (PDA), a computer, a TV, or any other electronic devices having a touch screen. The apparatus 100 may include a tactile sensor unit 110, a memory unit 120, a touch screen 130, and a control unit 140.

The tactile sensor unit 110 may detect contact of a user's hand when a user grips the apparatus 100. The tactile sensor unit 110 may detect the extent of the contact's pressure and a location of the contact/pressure. The tactile sensor unit 110 may be composed of tactile sensors, touch sensors, and/or a combination of pressure sensors and touch sensors. The tactile sensor unit 110 may be located on a lateral side of the apparatus 100, but not limited thereto. In some exemplary embodiments, the tactile sensor unit 110 may be located on every side of the apparatus 100.

Figure 1B:
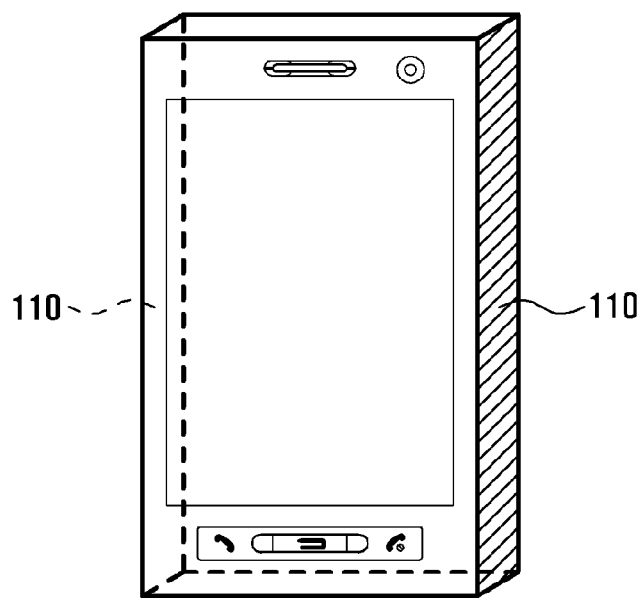
FIG. 1B shows an example of a tactile sensor unit located on lateral sides of the apparatus shown in FIG. 1A according to exemplary embodiments of the present invention.

FIG. 1B shows an example of the tactile sensor unit 110 located on lateral sides of the apparatus 100. After detecting the contact of a user's hand, the tactile sensor unit 110 may transmit a contact detection signal to the control unit 140. The tactile sensor unit 110 may include a left sensor part and a right sensor part, each of which may be composed of a plurality of sensor components.

The memory unit 120 may store a variety of programs required for performing functions of the apparatus 100 and data created while such functions are performed. The memory unit 120 may store data related to a process of assuming a manipulating hand and contact pattern information.

The touch screen 130 may display information and may receive user input. The touch screen 130 may include a display unit 132 and a touch sensor unit 134.

The display unit 132 may be formed of a liquid crystal display (LCD) or any other suitable type of display. The display unit 132 may provide a variety of graphical information related to states and operations of the apparatus 100. The display unit 132 may display a GUI depending on a manipulating hand. In some cases, the display unit 132 may display the GUI according to the position of the user's fingers that grip the apparatus 100.

The touch sensor unit 134 may determine whether the user's hand(s) touches the touch screen or not. The touch sensor unit 134 may be formed of capacitive touch sensors, pressure sensors, and/or any other suitable touch-sensitive sensors. When detecting the touch of the user's hand, the touch sensor unit 134 may transmit a touch signal to the control unit 140. The touch signal may include coordinate data representing the user's touch location. In some cases, the touch sensor unit 134 may be not included in the apparatus 100.

The control unit 140 may control states and operations of one or more elements of the apparatus 100. For example, the control unit 140 may receive a contact detection signal from the tactile sensor unit 110 and may determine the user's contact pattern by using the contact detection signal. Additionally, the control unit 140 may instruct the display unit 132 to display a GUI depending on the user's contact pattern.

Figure 2:
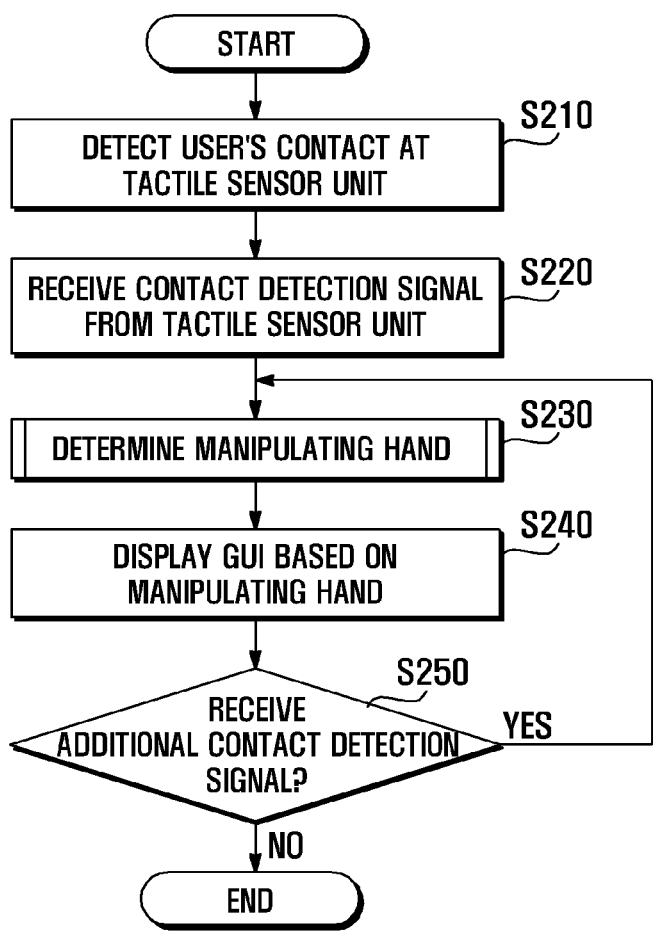
FIG. 2 is a flow diagram illustrating a method for displaying a GUI depending on a manipulating hand according to exemplary embodiments of the present invention.

FIG. 2 is a flow diagram illustrating a method for displaying a GUI depending on a manipulating hand according to exemplary embodiments of the present invention.

Referring to FIG. 2, the tactile sensor unit 110 may detect a user's contact (S210). The user's contact may be a result of the user gripping the apparatus 100. When detecting the user's contact, the tactile sensor unit 110 may transmit the contact detection signal to the control unit 140.

The control unit 140 may receive the contact detection signal from the tactile sensor unit 110 (S220). Next, the control unit 140 may determine the user's contact pattern and may thereby determine a manipulating hand (S230). Step S230 is illustrated in detail in FIG. 3, FIG. 4, and FIG. 5.

After step S230, the control unit 140 may instruct the touch screen 130 to display a GUI based on the manipulating hand (S240). The control unit 140 may then decide whether to receive an additional contact detection signal from the tactile sensor unit 110 (S250). If the control unit 140 decides to receive additional contact detection signal(s), the method for displaying a GUI may return to step S230 to redetermine the user's contact pattern and further redetermine the manipulating hand. The additional contact detection signal may be provided by the tactile sensor unit 110 when the user changes a grip form.

If the control unit 140 receives no additional contact detection signal from the tactile sensor unit 110, the display unit 132 may maintain a current GUI. Thereafter, the user may manipulate the displayed GUI on the touch screen 130 to input a command to the apparatus 100.

Figure 3:
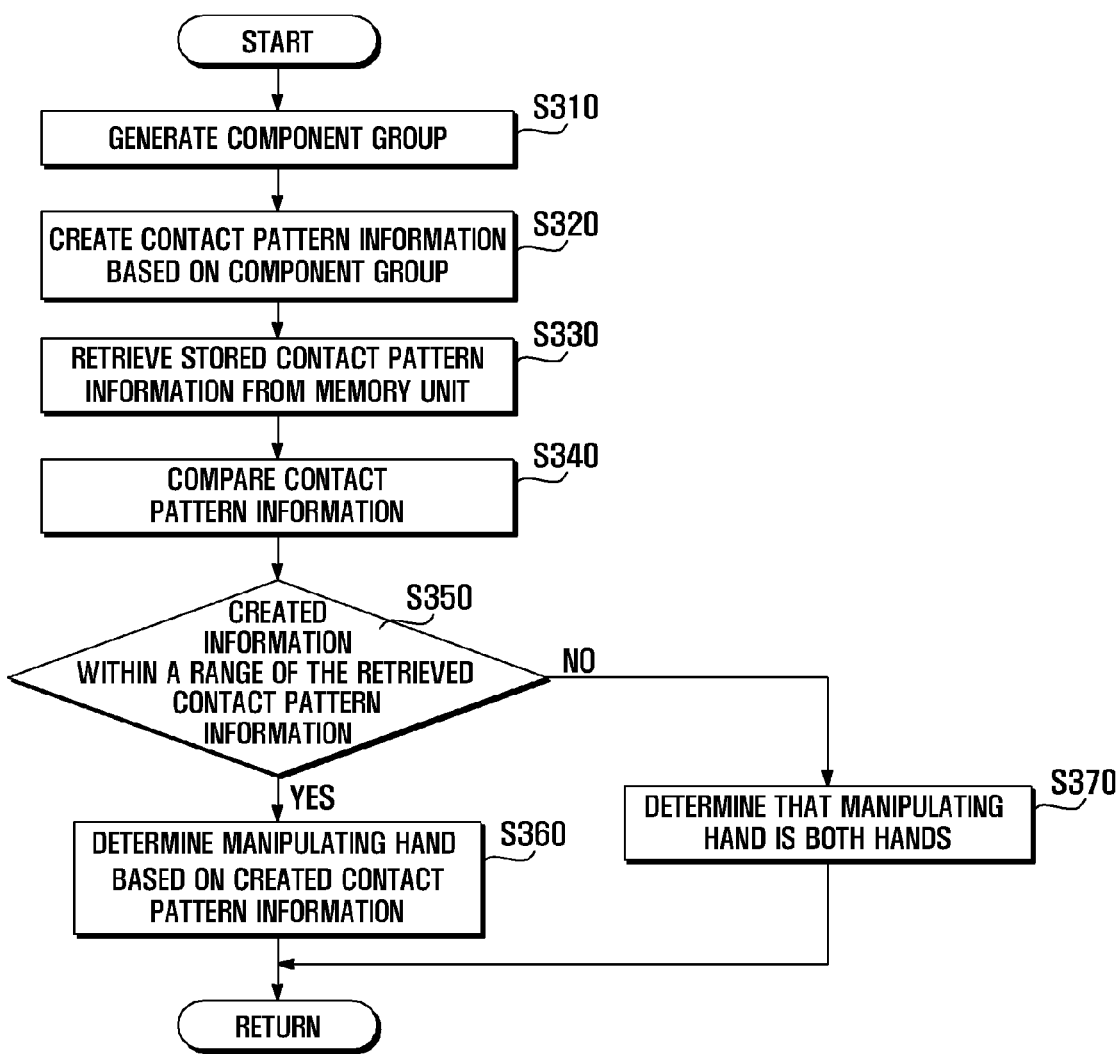
FIG. 3 is a flow diagram illustrating an example of a detailed process of the manipulating hand determination step in the GUI display method shown in FIG. 2 according to exemplary embodiments of the present invention.

FIG. 3 is a flow diagram illustrating an example of a detailed process of step S230 shown in FIG. 2 according to exemplary embodiments of the present invention.

Referring to FIG. 3, the control unit 140 may generate at least one component group based on the contact detection signal received from the tactile sensor unit 110 (S310). As noted above, the component group may refer to a set of sensor components arranged in one or more sequences among contact-detecting sensor components.

Exemplary embodiments of the sensor components and the component group are illustrated in FIG. 6A, FIG. 6B, FIG. 7A, and FIG. 7B.

Figure 6A:
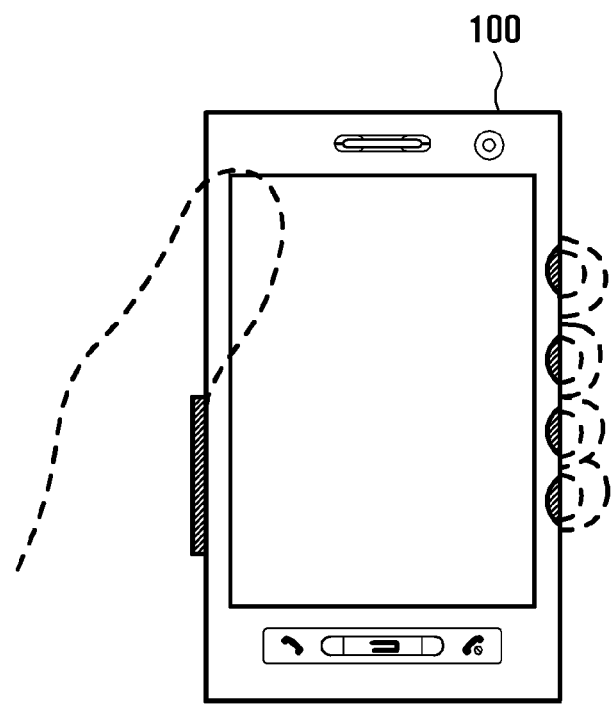
FIG. 6A shows an example of a left hand grip and the tactile sensor unit located on a lateral side of the apparatus according to exemplary embodiments of the present invention.
Figure 6A:
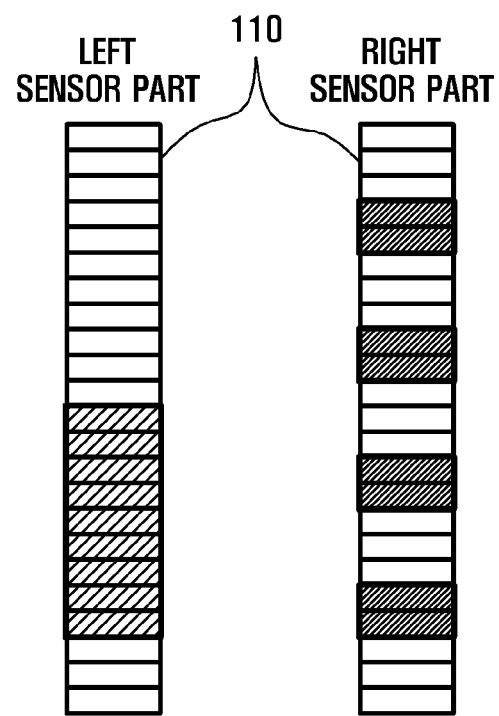

FIG. 6A shows an example of a user holding the apparatus 100 with a left hand grip. The tactile sensor unit 110 may be located on a lateral side of the apparatus 100. The left sensor part may be located on the left lateral side of the apparatus 100, and the right sensor part may be located on the right lateral side of the apparatus 100. Each sensor part may be composed of a plurality of sensor components. The number of the sensor components may vary according to a size of the sensor components. For example, the smaller the sensor components are sized, the more sensor components may be arranged on the lateral sides of the apparatus 100. In FIG. 6A, for example, the number of the sensor components belonging to each sensor part may be twenty three. Marked components among sensor components in the left sensor part may represent components having detected contact with the left hand. Among sensor components in the right sensor part, marked components may represent components having detected contact with fingers of the left hand (e.g., four fingers except the thumb). Contact-detecting components may be grouped by their arrangements in sequence. For example, sequentially arranged nine components in the left sensor part may be assigned to one group. And, four pairs of two components in the right sensor part may be assigned to four groups.

Returning to FIG. 3, after step S310 of generating the component group, the control unit 140 may create contact pattern information based on the component group (S320). Therefore, the contact pattern information may be different based on how the user grips the apparatus 100. The contact pattern information may include, for example, the number of component groups in each sensor part, the location of component groups, the interval between the component groups, the number of sensor components in each component group, and/or pressure detection data of each sensor component.

Referring to FIG. 6A, the contact pattern information of the left sensor part may contain the following data: one component group composed of nine sensor components located, for example, from the twelfth sensor component to the twentieth sensor component. The contact pattern information of the right sensor part may contain the following data: four component groups, each of which is composed of two sensor components located, for example, at the fourth, fifth, ninth, tenth, fourteenth, fifteenth, nineteenth and twentieth component positions. Three sensor components may be interposed between two adjacent component groups.

Returning to FIG. 3, the control unit 140 may retrieve stored contact pattern information from the memory unit 120 (S330). The memory unit 120 may store the contact pattern information, and, in general, may store different contact pattern information corresponding to different types of grip. Contact pattern information stored in the memory unit 120 may include, for example, the number of component groups in each sensor part, the location of component groups, the interval between the component groups, the number of sensor components in each component group, and/or pressure detection data of each sensor component.

The control unit 140 may subsequently compare the created contact pattern information with the retrieved contact pattern information (S340). For example, the control unit 140 may execute respective comparisons of the number of component groups in each sensor part, the location of component groups, the interval between the component groups, the number of sensor components in each component group, and/or pressure detection data of each sensor component.

The control unit 140 may also determine whether the created contact pattern information is within a range associated with the retrieved contact pattern information (S350). When the created information corresponds completely to the retrieved information, the control unit 140 may determine that the created information is within the range associated with the retrieved information. If an allowable margin is previously assigned to the contact pattern information stored in the memory unit 120, the created information may be within the allowable margin such that the created information may be determined to be within the range. The allowable margin may be respectively assigned to, for example, the number of component groups in each sensor part, the location of component groups, the interval between the component groups, the number of sensor components in each component group, and/or pressure detection data of each sensor component.

If the created contact pattern information is within the range of the retrieved contact pattern information, the control unit 140 may determine the manipulating hand corresponding to the created contact pattern information (S360). The memory unit 120 may already have stored information about different manipulating hands according to different contact pattern information. If the created contact pattern information belongs to a range of the retrieved contact pattern information, the control unit 140 can determine the manipulating hand corresponding to the created contact pattern information. The determined manipulating hand may be the left hand, or the right hand.

If the created contact pattern information does not belong to the range of the retrieved contact pattern information, the control unit 140 may determine that the manipulating hand is both hands (S370). After determining the manipulating hand, the control unit 140 may return to the previous step S240 of displaying a GUI according to the manipulating hand.

Figure 4:
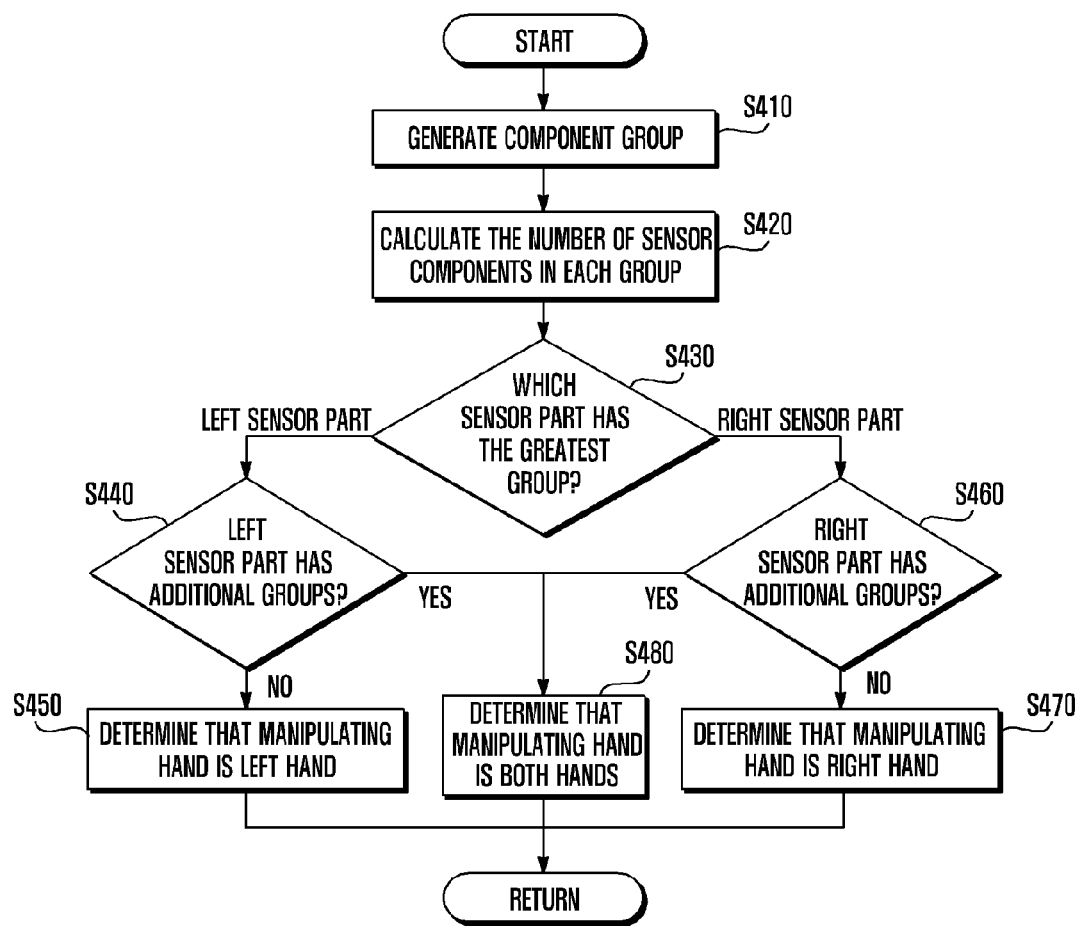
FIG. 4 is a flow diagram that illustrates another example of a detailed process of the manipulating hand determination step in the GUI display method shown in FIG. 2 according to exemplary embodiments of the present invention.

FIG. 4 is a flow diagram illustrating another example of a detailed process of step S230 shown in FIG. 2 according to exemplary embodiments of the present invention.

Referring to FIG. 4, the control unit 140 may generate at least one component group which may be a set of sensor components arranged in sequence among contact-detecting sensor components (S410). The control unit 140 may then calculate a number of sensor components contained in each component group (S420). For example, as noted in the example shown in FIG. 6A, a single component group in the left sensor part may have nine sensor components, and each of four component groups in the right sensor part may have two sensor components.

After calculating the number of sensor components in each component group, the control unit 140 may determine which component group and sensor part may have the largest number of contact-detecting sensor components (S430). For example, the largest component group may be in the left sensor part or the right sensor part, and accordingly the control unit 140 may determine whether the largest sensor part is the left sensor part or the right sensor part in step S430. For example, referring to FIG. 6A, the control unit 140 may determine that the largest component group has nine sensor components and is located in the left sensor part. Referring to another example illustrated in FIG. 6B, the largest component group may have nine sensor components and may be located in the right sensor part. Therefore, the control unit 140 may determine that the largest sensor part is the right sensor part. Similarly, the largest sensor part may be the left sensor part in FIG. 7A and the right sensor part in FIG. 7B.

If the largest sensor part is the left sensor part, the control unit 140 may further determine whether the left sensor part has additional component groups (S440). The additional component groups may refer to one or more component groups situated in the largest sensor part but that is not the largest component group. In FIG. 6A, for example, the left sensor part, which is the largest sensor part, may have the largest component group and no additional component group. However, in FIG. 7A, the left sensor part, together with the largest component group, may have one additional component group composed of three sensor components from the third sensor component to the fifth sensor component.

If there is no additional component group, as shown in FIG. 6A, the control unit 140 may determine that the manipulating hand is the left hand (S450). The largest component group may then be considered to be in contact with the palm of the left hand. Also, having no additional component group may indicate that the thumb of the left hand may not be in contact with the tactile sensor unit 110. In these cases, the control unit 140 may determine that a user may manipulate the touch screen 130 with the thumb of the left hand. That is, the user may use his or her left hand to grip the apparatus 100 and to touch the touch screen 130. The control unit 140 may determine that the manipulating hand is the left hand.

Figure 6B:
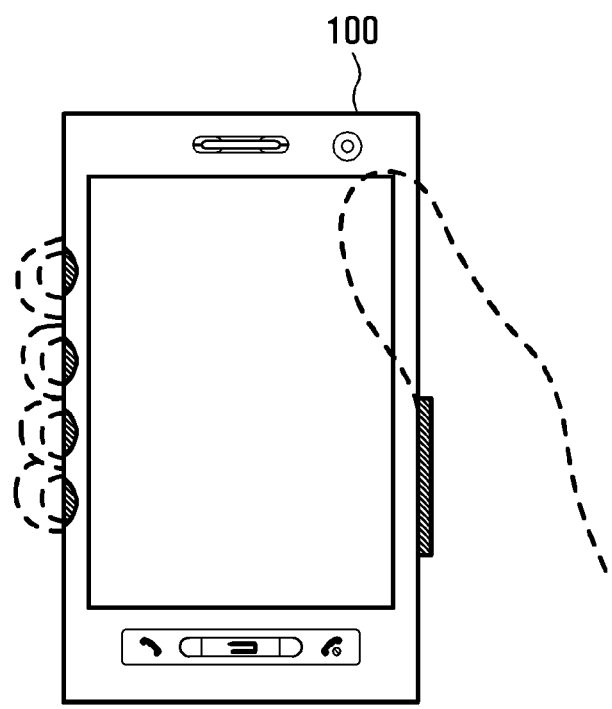
FIG. 6B shows an example of a right hand grip and the tactile sensor unit located on a lateral side of the apparatus according to exemplary embodiments of the present invention.
Figure 6B:
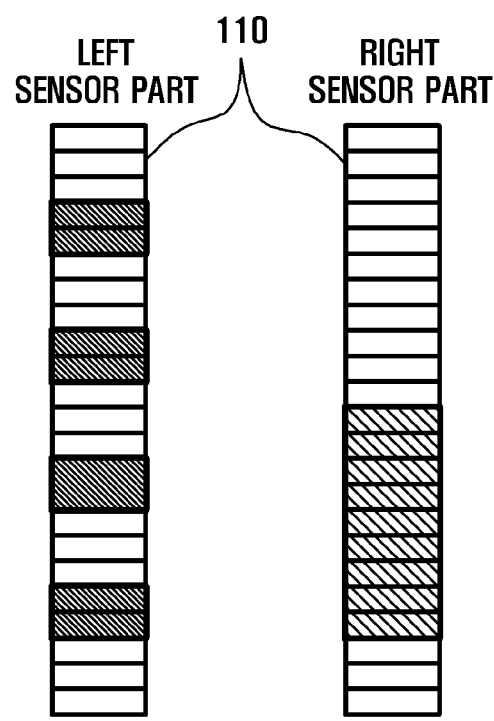

Similar steps may be taken if the manipulating hand is determined to be the right hand. For example, if the largest sensor part is the right sensor part, the control unit 140 may determine whether the right sensor part has additional component groups (S460). If the right sensor part has no additional component group, as shown in FIG. 6B, the control unit 140 may determine that the manipulating hand is the right hand (S470).

If the right sensor part has additional component groups, the control unit 140 may determine that both hands may be the manipulating hand (S480). The presence of additional component groups may indicate that the thumb of the user's gripping hand is in contact with the tactile sensor unit 110. The control unit 140 may determine that a user may manipulate the touch screen 130 with the thumb of a non-gripping hand. So, the control unit 140 determines that the manipulating hand is both hands.

Figure 5:
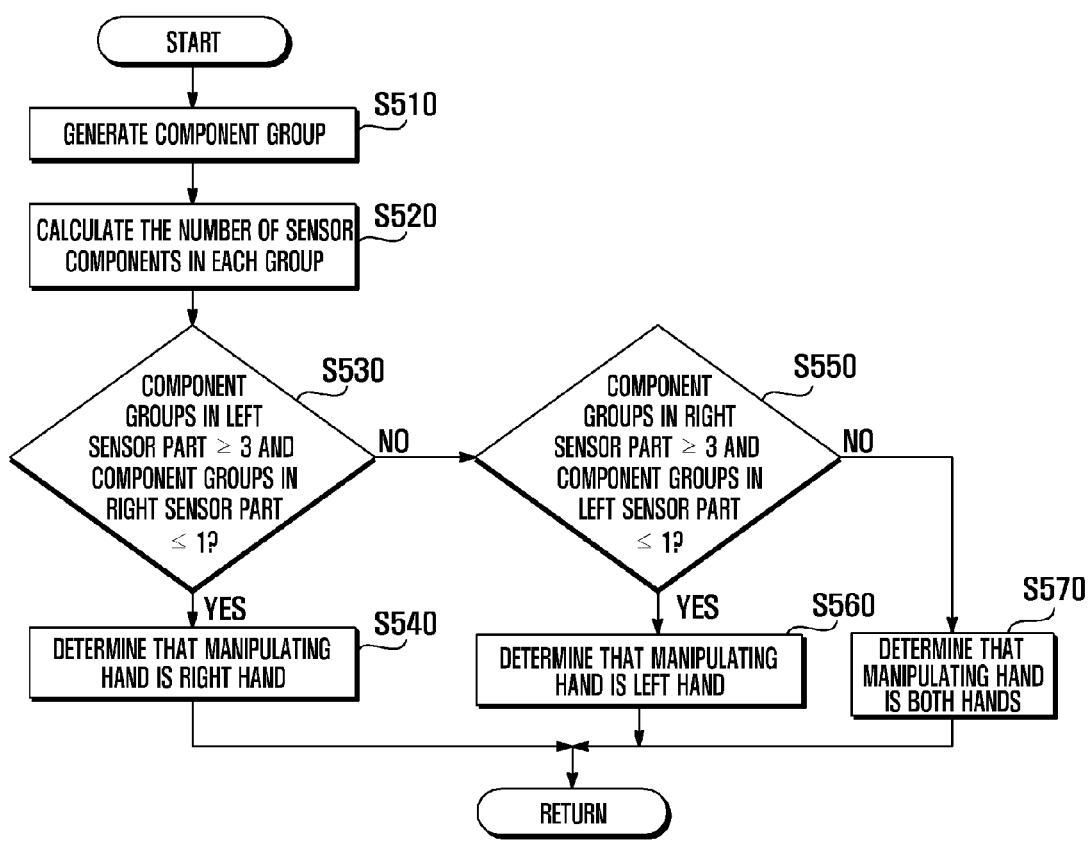
FIG. 5 is a flow diagram illustrating another example of a detailed process of the manipulating hand determination step in the GUI display method shown in FIG. 2 according to exemplary embodiments of the present invention.

FIG. 5 is a flow diagram illustrating another example of a detailed process of step S230 shown in FIG. 2 according to exemplary embodiments of the present invention.

Referring to FIG. 5, the control unit 140 may generate at least one component group which may be a set of sensor components arranged in sequence among contact-detecting sensor components (S510). The control unit 140 may calculate the number of component groups contained in each sensor part (S520). In FIG. 6A, FIG. 6B, FIG. 7A, and FIG. 7B, the sensor parts may be the left sensor part and the right sensor part. In some cases, the control unit 140 may calculate simultaneously the number of component groups in the left sensor part and the right sensor part.

Figure 7A:
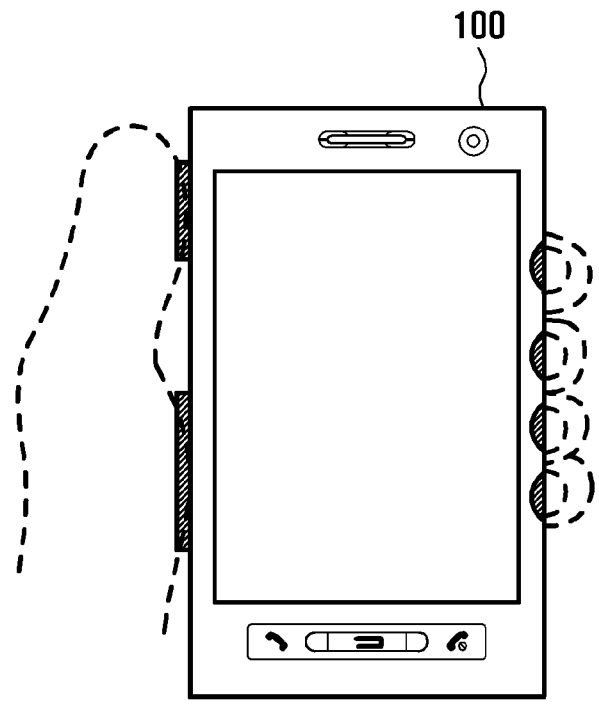
FIG. 7A shows another example of a left hand grip and the tactile sensor unit located on a lateral side of the apparatus according to exemplary embodiments of the present invention.
Figure 7A:
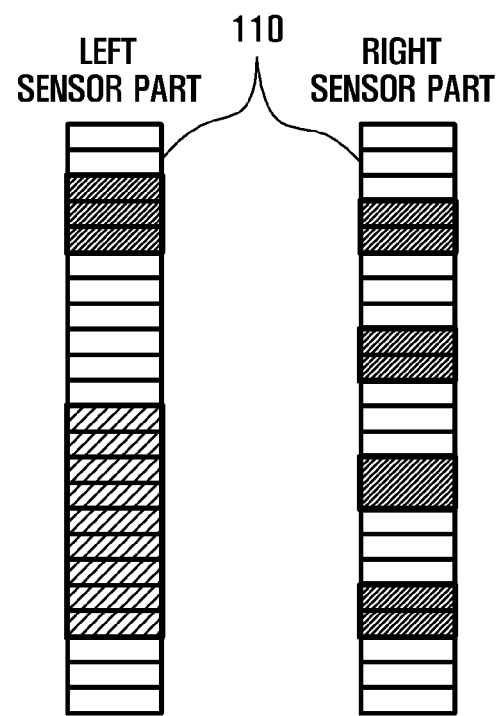
Figure 7B:
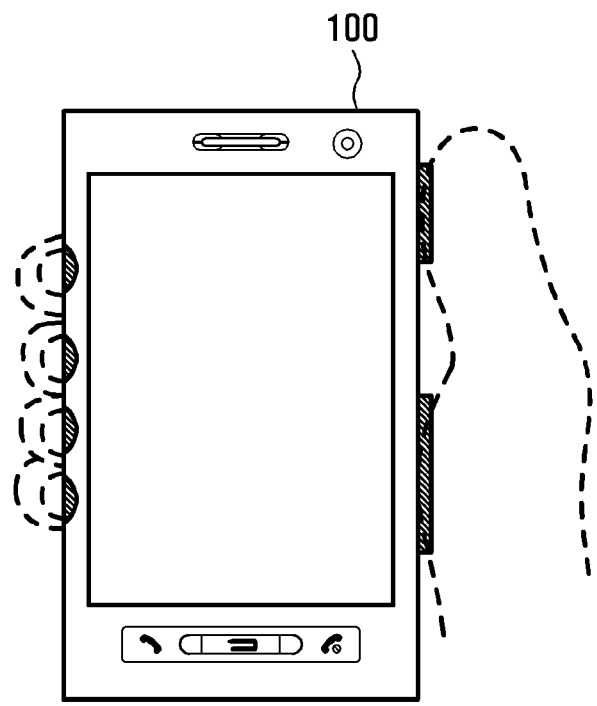
FIG. 7B shows another example of a right hand grip and the tactile sensor unit located on a lateral side of the apparatus according to exemplary embodiments of the present invention.
Figure 7B:
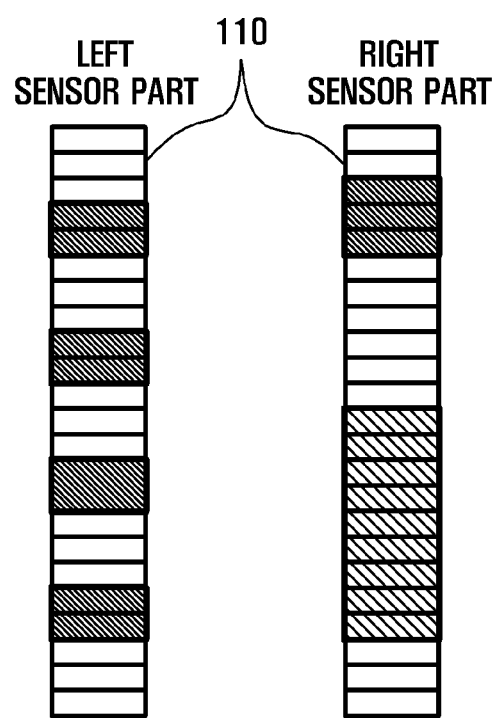

For example, in FIG. 6A, the number of component groups may be one in the left sensor part and four in the right sensor part. In FIG. 6B, the number of component groups may be four in the left sensor part and one in the right sensor part. In FIG. 7A, the number of component groups may be two in the left sensor part and four in the right sensor part. In FIG. 7B, the number of component groups may be four in the left sensor part and two in the right sensor part.

The control unit 140 may determine whether the number of component groups is three or more in the left sensor part and one or less in the right sensor part (S530). If the number of component groups is three or more in the left sensor part and one or less in the right sensor part, the control unit 140 may determine that the manipulating hand is the user's right hand (S540). Three or more component groups in the left sensor part may indicate that at least three fingers except the thumb are in contact with the left sensor part. One or less component group in the right sensor part may indicate that the palm of the user's right hand is in contact with the right sensor part but the thumb may not be in contact. In such cases, the control unit 140 may determine that the user may manipulate the touch screen with the user's right hand thumb. That is, a user's right hand may be used to grip the apparatus 100 and to touch the touch screen 130. Accordingly, the control unit 140 may determine that the manipulating hand is the right hand.

Similarly, in determining that the manipulating hand is the left hand, the control unit 140 may determine whether the number of component groups is three or more in the right sensor part and is one or less in the left sensor part (S550).

If the answer is no in both steps 530 and 550, the control unit 140 may determine that the manipulating hand is both hands (S570).

Figure 8:
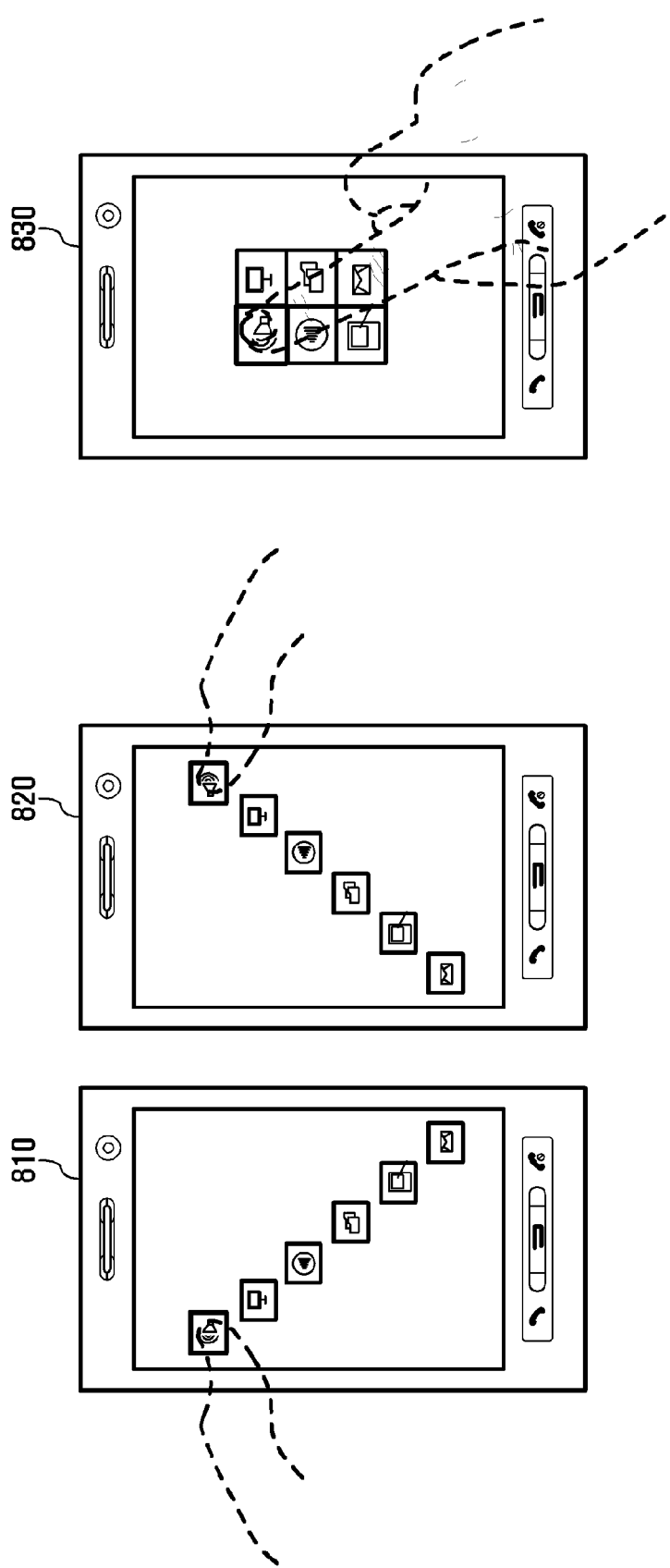
FIG. 8 illustrates an example of a GUI according to exemplary embodiments of the present invention.

FIG. 8 illustrates an example of a GUI according to exemplary embodiments of the present invention.

FIG. 8 illustrates an exemplary embodiment of a display screen 810 having menu icons and with the left hand determined to be the manipulating hand. The control unit 140 may arrange the menu icons from the upper left corner to the lower right corner of the display screen 810 to correspond to a moving path of the left thumb. Accordingly, a user can select icons by touching the display screen 810 with his or her left thumb to execute desired functions corresponding to the selected icons. Since the menu icons are arranged along a moving path of the left thumb, no icon may be hidden from the thumb and an unexpected touch of an icon may be prevented.

FIG. 8 also illustrates an exemplary embodiment of a display screen 820 with the right hand determined to be the manipulating hand. In such cases, the control unit 140 may arrange the menu icons along a moving path of the right thumb. In some other cases when both hands are determined to be the manipulating hand, as shown by display screen 830 in FIG. 8, the control unit 140 may maintain a normal GUI changeable according to the user's intent.

Figure 9:
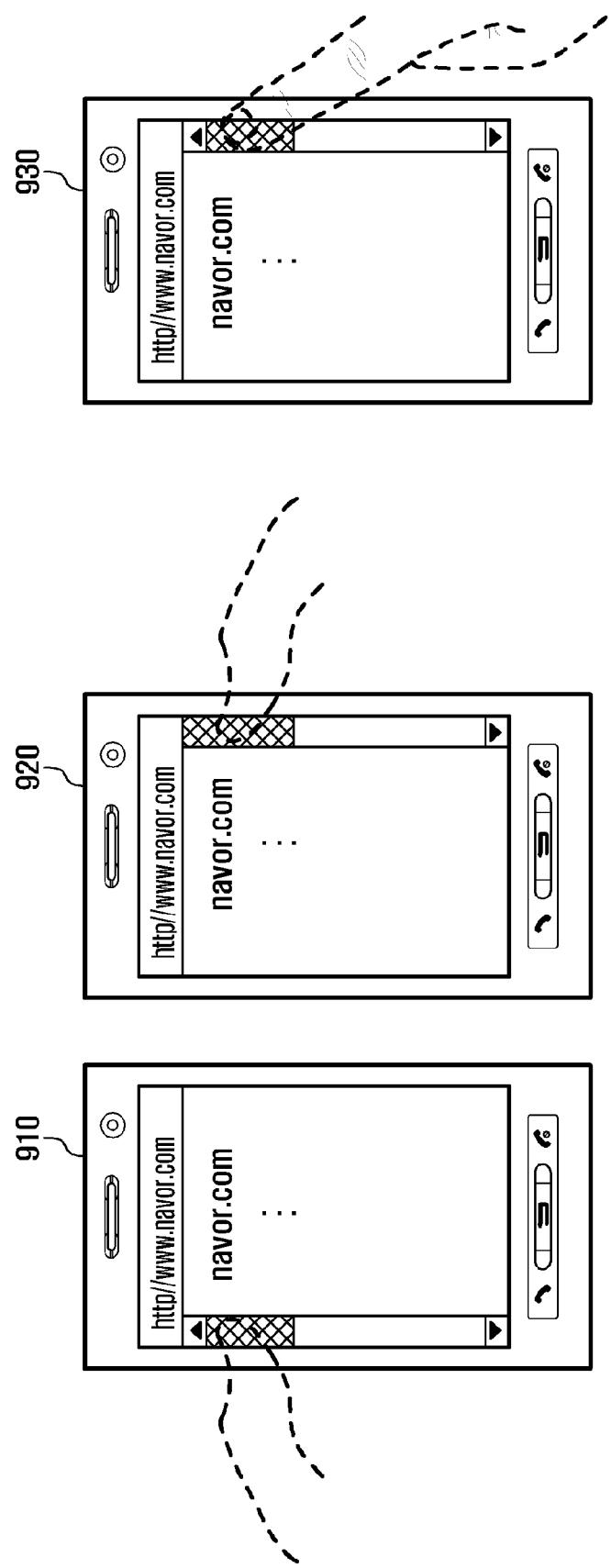
FIG. 9 illustrates another example of a GUI according to exemplary embodiments of the present invention.
Figures 10A, 10B:
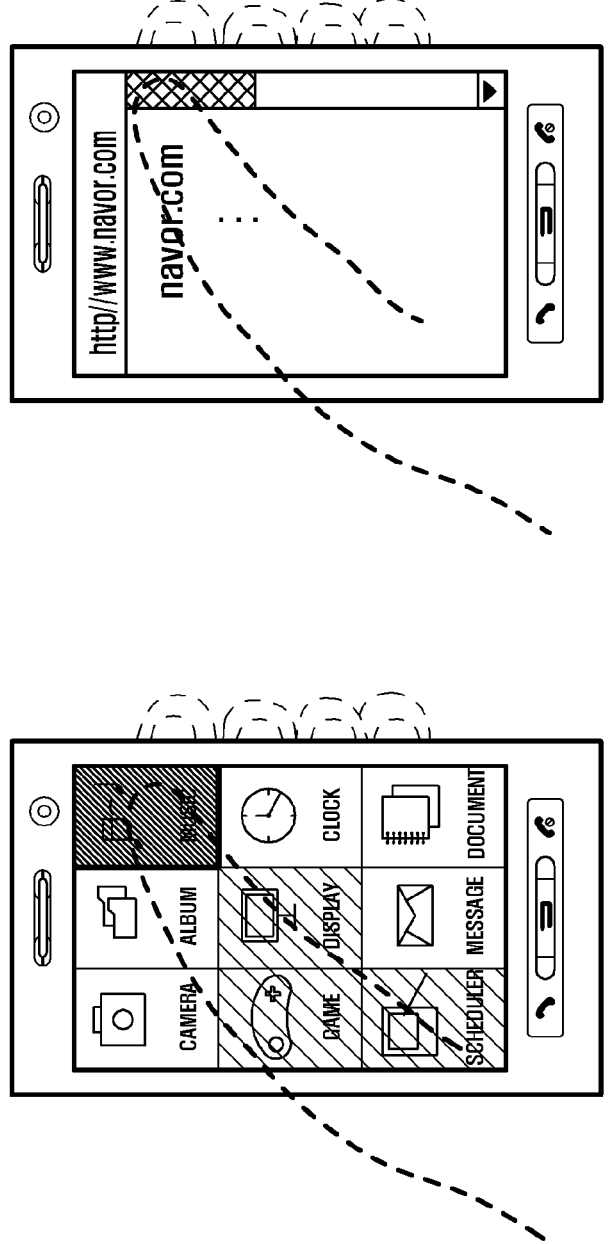
FIG. 10A is an illustrative example showing a user's left thumb selecting one of the menu icons displayed on a touch screen according to a conventional GUI.
FIG. 10B is another illustrative example showing a user's left thumb touching a scroll bar presented on a touch screen according to a conventional GUI.

FIG. 9 illustrates another example of a GUI according to exemplary embodiments of the present invention.

FIG. 9 illustrates an exemplary embodiment of a display screen 910 having a scroll bar and with the left hand determined to be the manipulating hand. The control unit 140 may arrange the scroll bar along the left side of the display screen 910 to correspond to a moving path of the left thumb. Accordingly, a user can move up and down the scroll bar by dragging it with the user's left thumb. Since the scroll bar may be arranged along the left side, displayed content may not be hidden by the thumb and an unexpected touch of the displayed content may be prevented.

FIG. 9 also illustrates an exemplary embodiment of a display screen 920 having a scroll bar and with the right hand determined to be the manipulating hand. In such cases, the control unit 140 may arrange the scroll bar along the right side of the display screen 920 to correspond to a moving path of the right thumb. Therefore, a user can move/drag the scroll bar with the user's right thumb without covering or touching displayed content. Accordingly, an unexpected touch to the displayed content may be prevented while the user drags the scroll bar. In some other cases, as shown by display screen 930 in FIG. 9, the control unit 140 may maintain a normal GUI changeable when both hands are determined to be the manipulating hand.

Figure 11:
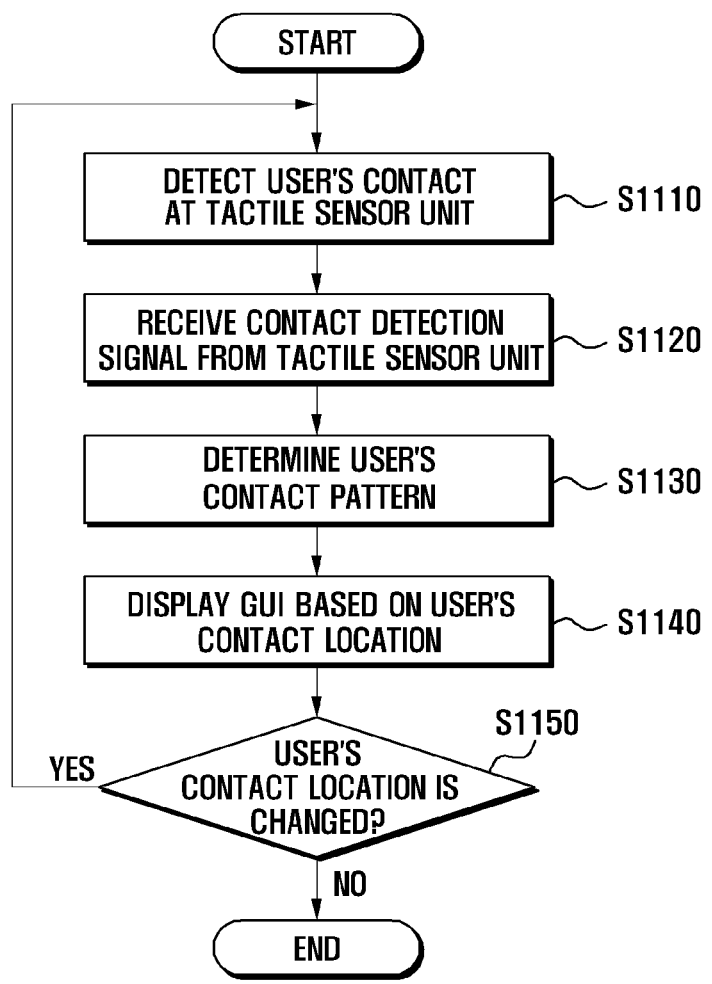
FIG. 11 is a flow diagram illustrating a method for displaying a GUI depending on a manipulating hand according to exemplary embodiments of the present invention.

FIG. 11 is a flow diagram illustrating a method for displaying a GUI based on a manipulating hand according to exemplary embodiments of the present invention. The method described with reference to FIG. 11 may be applicable, for example, when a user uses the tactile sensor unit 110 to input a command to the apparatus 100.

Figure 12A:
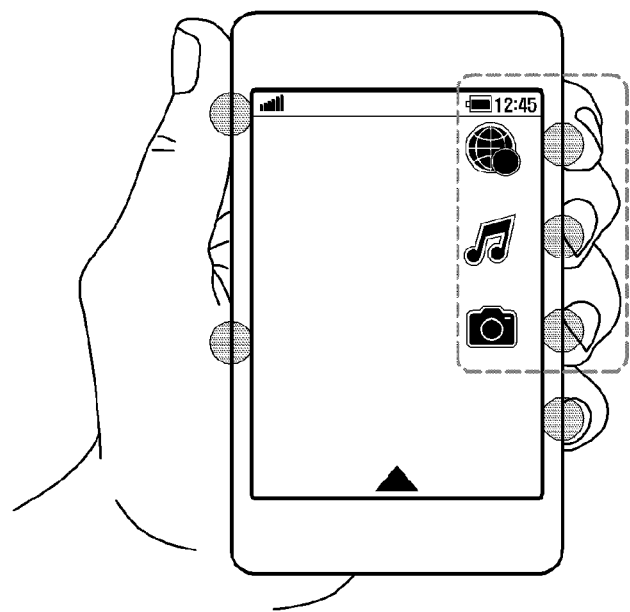
FIG. 12A illustrates an example of a screen on which menu icons are displayed in an idle screen application by a user's contact according to exemplary embodiments of the present invention.
Figure 12B:
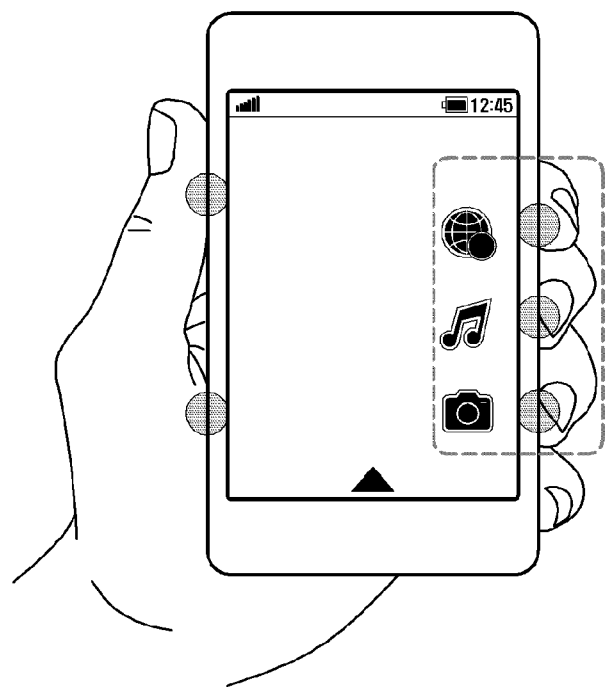
FIG. 12B illustrates an example of a screen on which displayed menu icons are changed in an idle screen application by a user's new contact according to exemplary embodiments of the present invention.
Figure 13A:
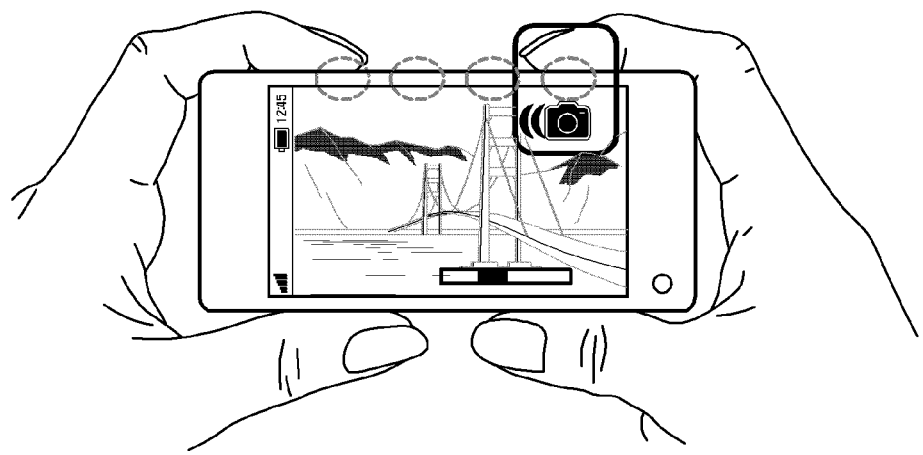
FIG. 13A illustrates an example of a screen on which function icons are displayed in a camera application by a user's contact according to exemplary embodiments of the present invention.
Figure 13B:
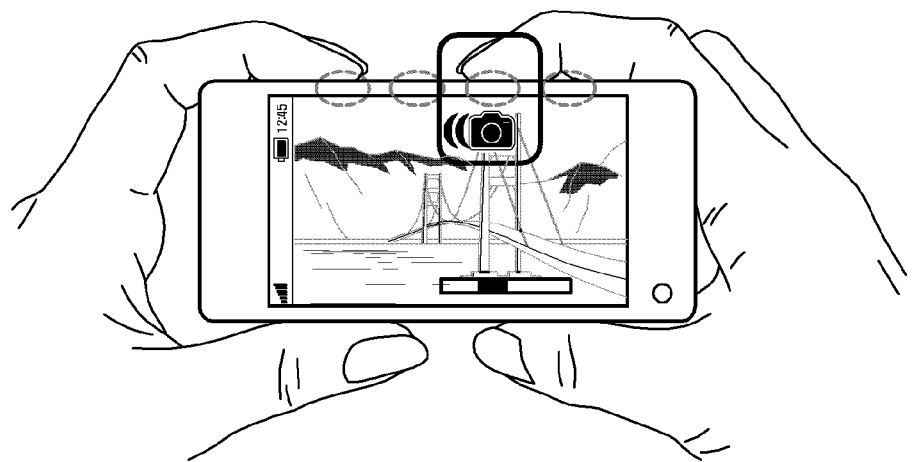
FIG. 13B illustrates an example of a screen on which the displayed function icons are changed in a camera application by a user's new contact according to exemplary embodiments of the present invention.

Referring to FIG. 11, the tactile sensor unit 110 may detect a user's contact (S1110). The user's contact may correspond to the user's gripping of the apparatus 100. For example, the user can grip the apparatus 100 with one hand as shown in FIG. 12A and FIG. 12B or with both hands as shown in FIG. 13A and FIG. 13B. When detecting the user's contact, the tactile sensor unit 110 may transmits the contact detection signal, which includes information about the location and pressure of contacts, to the control unit 140.

The control unit 140 may receive the contact detection signal from the tactile sensor unit 110 (S1120). Next, the control unit 140 may determine the user's contact pattern depending on the contact detection signal (S1130). Determination of the user's contact pattern may be based on information about the location and pressure of contacts. In some cases, the memory unit 120 may store a list of the user's grip forms in connection with the location and pressure of the user's contacts. The control unit 140 may retrieve, from the memory unit 120, a specific grip form corresponding to the received information about the location and pressure of contacts. For example, the control unit 140 may determine that a user's left hand grips the apparatus 100 if two contact detection signals from the left sensor part and four contact detection signals from the right sensor part, as shown in FIG. 12A, are received.

Then, the control unit 140 may instruct the display unit 132 to display a GUI at a specific location on the display unit 132 depending on the user's contact location (S1140). Specifically, the control unit 140 may first identify the currently executed application (before displaying a GUI), and may then select GUI elements corresponding to the currently executed application. For example, when an idle screen application is running, the control unit 140 may select menu icons as GUI elements for an idle screen. In other cases, if a camera application is running, the control unit 140 may select an icon for taking a photo and a scroll bar for zooming in/out to display. After selecting customized GUI elements, the control unit 140 may determine a GUI arranging pattern based on the currently executed application and the user's grip form. For example, referring to FIG. 12A and FIG. 12B, the control unit 140 may recognize an idle screen application as the currently executed application and may also determine that the user's left hand is gripping the apparatus 100. The control unit 140 may then determine a GUI arranging pattern such that menu icons may be disposed near a contact location of at least one of four fingers (except the thumb) of the user's left hand.

After determining a GUI arranging pattern, the control unit 140 may instruct the display unit 132 to display GUI elements based on the GUI arranging pattern. That is, previously selected GUI elements may be displayed on the display unit 132 according to the GUI arranging pattern.

FIG. 12A and FIG. 12B illustrate two examples of a screen in which menu icons are displayed in an idle screen application according to exemplary embodiments of the present invention. As shown in FIG. 12A and FIG. 12B, three menu icons may be disposed at positions in a widthwise direction from three finger contact locations. The memory unit 120 may store rankings of how frequently the menus and menu icons are used. The control unit 140 may arrange menu icons in order of the usage frequency. For example, when a user grips the apparatus 100 during the execution of an idle screen application, the control unit 140 may retrieve the usage frequency rankings of menus from the memory unit 120 and may instruct the display unit 132 to display menu icons according to the retrieved rankings. The display of icons in the display unit 132 may be changed according to the user's preference.

The control unit 140 may also change the location of GUI elements according to the pressure of the user's contact. Referring to FIG. 12A and FIG. 12B, when the user increases the pressure (e.g., pressure increases beyond a predetermined pressure threshold) of contacts while gripping the apparatus 100, menu icons displayed on the display unit 132 may move towards the right side of the screen, namely, towards the pressed fingers. Furthermore, the control unit 140 may execute a specific application when the corresponding icon reaches the right side of the display unit 132. In some cases, the control unit 140 may decide whether to execute applications based on the contact pressure of the user's fingers and/or when the icons reach the right side of the display unit 132.

The control unit 140 may also change the display size of GUI elements according to the pressure of a user's contact. For example, when the user increases the pressure of contacts, menu icons displayed on the display unit 132 may be enlarged or reduced in size. An increase of contact pressure may highlight menu icons displayed on the display unit 132.

FIG. 13A and FIG. 13B illustrate two examples of a screen in which function icons are displayed in a camera application according to exemplary embodiments of the present invention. Referring to FIG. 13A and FIG. 13B, a user may grip the apparatus 100 with thumbs and forefingers of both hands. An icon for taking a photo may be located at a position close to the forefinger of the right hand, and a scroll bar for zooming in/out may be located at a position in a lengthwise direction from the thumb of the right hand. If the user increases the pressure of contact by the right forefinger, an icon for taking a photo moves towards the right forefinger. When this icon reaches the upper side of the display unit 132, a function of taking a photo may be executed. In addition, the user can increase the pressure of contact by the right thumb to regulate zooming in/out.

Figure 14A:
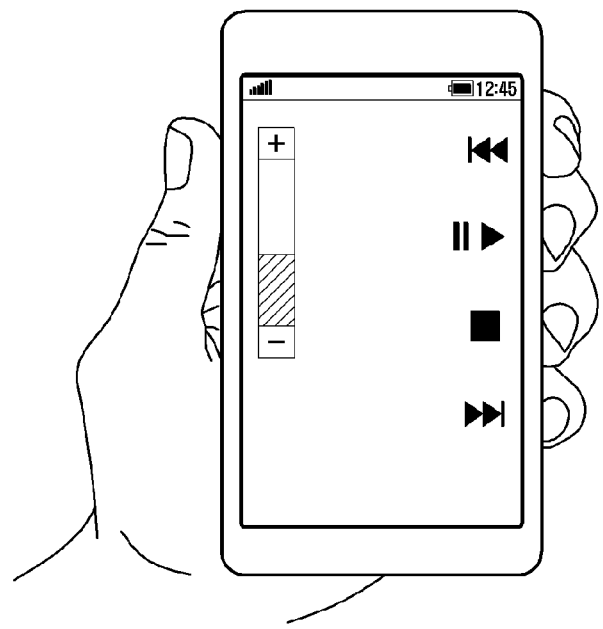
FIG. 14A illustrate an example of a screen on which function icons are displayed in an MP3 application by a user's contact according to exemplary embodiments of the present invention.
Figure 14B:
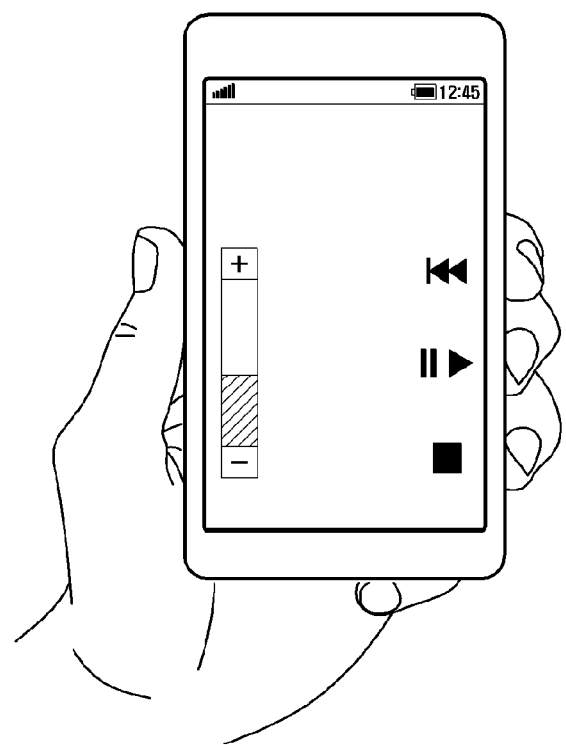
FIG. 14B illustrate an example of a screen on which the displayed function icons are changed in an MP3 application by a user's new contact according to exemplary embodiments of the present invention.

FIG. 14A and FIG. 14B illustrate two examples of a screen on which function icons are displayed in an MP3 application. Referring to FIG. 14A and FIG. 14B, a user may grip the apparatus 100 with the left hand. Function icons may be displayed depending on the contact locations of fingers of the left hand except the thumb, whereas a volume control bar may be displayed depending on the contact location of the thumb. The displayed function icons may follow a predefined GUI arranging pattern. While gripping the apparatus 100, the user can regulate execution of an MP3 application by increasing a contact pressure or taking an action such as tapping. For example, the location, size, and/or expression effect of icons may vary according to the user's contact.

Returning to FIG. 11, after displaying a GUI, the control unit 140 may determine whether the user's contact location has changed (S1150). Specifically, when a user changes a grip form while gripping the apparatus 100, the tactile sensor unit 110 may detect a change in the user's contact and may generate a new contact detection signal. The control unit 140 may then receive the new contact detection signal from the tactile sensor unit 110, may determine the user's contact pattern again, and may modify display of a GUI depending on the new contact pattern.

Referring to FIG. 12A and FIG. 12B, the user's contact in FIG. 12B may be different than the user's contact in FIG. 12A. For example, the location of fingers may have moved downward in FIG. 12B. The control unit 140 may receive a new contact detection signal from the tactile sensor unit 110 and may determine a new contact pattern based on new information about the location and pressure of contacts. The control unit 140 may then instruct the display of a GUI to change according to the new contact pattern.

Comparing FIG. 13A and FIG. 13B, the user's right forefinger may have moved (e.g., to the left) in FIG. 13B, as compared to FIG. 13A. The control unit 140 may receive a new contact detection signal, determine a new contact pattern, and move the photo icon toward a current forefinger contact, as shown in FIG. 13B.

Referring to FIG. 14A and FIG. 14B, the number of contacts as well as the location of contacts may change. For example, four contacts on the right side in FIG. 14A may move downward and may be reduced to three contacts in FIG. 14B. In addition, a contact on the left side may move downward. A volume control bar may also move downward along the left side. Additionally, a backward icon, a play/pause icon, and a stop icon may move downward along the right side, whereas a forward icon corresponding to a finger (e.g., smallest finger) of the left hand may be removed from the display unit 132.

As noted hereinabove, exemplary embodiments of the present invention disclose a method and apparatus for displaying and modifying a GUI depending on the location and pressure of a user's contacts. Accordingly, exemplary embodiments of the present invention may prevent confusion when a user manipulates an apparatus.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method, comprising:
   detecting a touch input on at least one lateral side of an apparatus;
   determining at least one graphical user interface (GUI) element based on an application executed in association with the apparatus;
   displaying, via a display unit associated with the apparatus, the at least one GUI element;
   detecting, in association with detecting the touch input, a drag input on the display unit; and
   executing, according to the drag input, a function based on the at least one GUI element.

2. The method of claim 1, wherein a location of the at least one GUI element is determined according to a location of the touch input.

3. The method of claim 1, wherein the touch input is a tap on the at least one lateral side of the apparatus.

4. The method of claim 1, wherein the display unit is a touch screen.

5. The method of claim 1, wherein executing the function comprises executing an application corresponding to the at least one GUI element.

6. The method of claim 1, wherein executing the function comprises changing at least one display characteristic of the at least one GUI element.

7. The method of claim 1, wherein the touch input is a contact to a tactile sensor unit located on the at least one lateral side of the apparatus.

8. The method of claim 7, wherein determining the at least one GUI element comprises determining a GUI arranging pattern based on the executed application and a contact pattern of the touch input.

9. The method of claim 1, wherein detection of the drag input is substantially contemporaneous with detection of the touch input.

10. An apparatus, comprising:
    a sensor unit configured to detect a touch input on at least one lateral side of the apparatus;
    a touch screen configured to detect a drag input, detection of the drag input being in association with detection of the touch input; and
    a control unit configured to:
      determine at least one graphical user interface (GUI) element based on an application executed in association with the apparatus,
      cause, at least in part, the at least one GUI element to be displayed via the touch screen, and
      execute, according to the drag input, a function based on the at least one GUI element.

11. The apparatus of claim 10, wherein a location of the at least one GUI element is determined according to a location of the touch input.

12. The apparatus of claim 10, wherein the touch input is a tap on the at least one lateral side of the apparatus.

13. The apparatus of claim 10, wherein the control unit is configured to execute an application corresponding to the at least one GUI element.

14. The apparatus of claim 10, wherein the control unit is configured to change at least one display characteristic of the at least one GUI element.

15. The apparatus of claim 10, wherein:
    the sensor unit comprises a tactile sensor unit, the tactile sensor unit being disposed on the at least one lateral side of the apparatus; and
    the touch input is a contact to the tactile sensor unit.

16. The method of claim 15, wherein the control unit is configured to determine a GUI arranging pattern based on the executed application and a contact pattern of the touch input.

17. The apparatus of claim 10, wherein detection of the drag input is substantially contemporaneous with detection of the touch input.

18. An apparatus, comprising:
    at least one processor; and
    at least one memory comprising computer code, the at least one memory and the computer code configured to, with the at least one processor, cause the apparatus at least to:
      detect a touch input to at least one lateral side of the apparatus;
      determine, based on an application executed in association with the apparatus, at least one graphical user interface (GUI) element;
      present, via a display unit, the at least one GUI element;
      detect, in association with detection of the touch input, a drag input on the display unit; and
      execute, according to the drag input, a function based on the at least one GUI element.

19. The apparatus of claim 18, wherein execution of the function comprises modification of at least one display characteristic of the at least one GUI element.

20. The apparatus of claim 18, wherein detection of the drag input is substantially contemporaneous with detection of the touch input.

* * * * *